US009524749B2

(12) United States Patent
Eldin et al.

(10) Patent No.: US 9,524,749 B2
(45) Date of Patent: *Dec. 20, 2016

(54) DIAGNOSTIC METHOD AND APPARATUS FOR A TAPE STORAGE SYSTEM

(71) Applicant: Dell Products, LP, Round Rock, TX (US)

(72) Inventors: Dina A. Eldin, Round Rock, TX (US); Robert C. Dawson, Round Rock, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/941,079

(22) Filed: Nov. 13, 2015

(65) Prior Publication Data

US 2016/0071540 A1    Mar. 10, 2016

Related U.S. Application Data

(63) Continuation of application No. 14/320,080, filed on Jun. 30, 2014, now Pat. No. 9,202,516.

(51) Int. Cl.
  *G11B 20/18* (2006.01)
  *G11B 5/008* (2006.01)

(52) U.S. Cl.
  CPC ....... *G11B 20/1833* (2013.01); *G11B 5/00817* (2013.01); *G11B 20/1816* (2013.01)

(58) Field of Classification Search
  None
  See application file for complete search history.

(56) References Cited

U.S. PATENT DOCUMENTS

| 4,631,479 | A | 12/1986 | Haga |
| 6,539,514 | B1 | 3/2003 | Bartlett |
| 8,355,219 | B2 | 1/2013 | Saliba |
| 8,767,325 | B2 | 7/2014 | Natsui |
| 9,202,516 | B1 * | 12/2015 | Eldin ................ G11B 5/00817 |
| 2009/0113129 | A1 | 4/2009 | Deicke et al. |
| 2012/0079185 | A1 | 3/2012 | Abe et al. |

* cited by examiner

*Primary Examiner* — K. Wong
(74) *Attorney, Agent, or Firm* — Larson Newman, LLP (57) ABSTRACT

A diagnostic method and system comprising writing to a tape location of a tape medium using a first tape head as the tape medium is transported in a first direction, reading from the tape location using a second tape head as the tape medium is transported in the first direction, detecting an occurrence of a tape system failure, performing a diagnostic tape operation selected from a group consisting of writing to the tape location using the second tape head as the tape medium is transported in the first direction and reading from the tape location using the first tape head as the tape medium is transported in the first direction, differentially diagnosing a tape medium failure or a tape head failure depending on whether the tape operation failure is observed in response to performing the diagnostic tape operation, and posting a corresponding error code.

20 Claims, 5 Drawing Sheets

DIAGNOSTIC METHOD AND APPARATUS FOR A TAPE STORAGE SYSTEM

CROSS REFERENCE TO RELATED APPLICATIONS

This application is a continuation of U.S. patent application Ser. No. 14/320,080, entitled "Diagnostic Method and Apparatus for a Tape Storage System," filed on Jun. 30, 2014, the disclosure of which is hereby expressly incorporated by reference in its entirety.

FIELD OF THE DISCLOSURE

The present disclosure generally relates to information handling systems, and more particularly relates to storage systems utilizing a tape medium.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
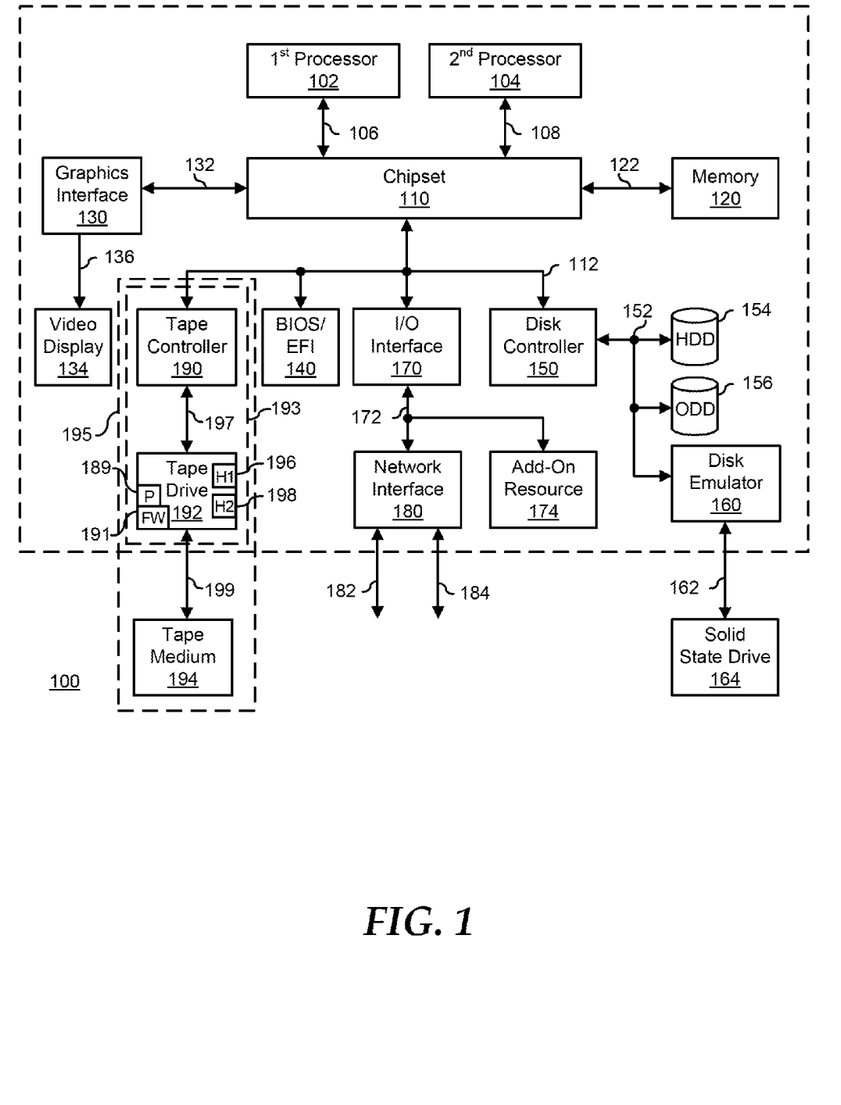
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, a basic input and output system/extensible firmware interface (BIOS/EFI) module 140, a disk controller 150, a disk emulator 160, an input/output (I/O) interface 170, a network interface 180, and tape system 195. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, I/O interface 170, and tape controller 190 of tape system 195 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Tape system 195 comprises tape subsystem 193 and tape medium 194. Tape subsystem 193 comprises tape controller 190 and tape drive 192. Tape drive 192 comprises a first tape head 196 and a second tape head 198. Tape drive 192 is connected to tape controller 190 via connection 197. Tape medium 194 can be inserted into tape drive 192 to provide magnetic coupling 199 with first tape head 196 and with second tape head 198. Tape controller 190 controls tape drive 192. Tape drive 192 comprises a processor 189 and firmware 191. Firmware 191 comprises instructions executed by processor 189 to operate tape drive 192. Tape drive 192 can transport tape medium 194 in a first direction relative to first tape head 196 and second tape head 198 or in a second direction, opposite the first direction, relative to first tape head 196 and second tape head 198.

Tape system 195 performs tape operations on tape medium 194 at any desired tape locations of tape medium 194 using first tape head 196 and second tape head 198 while transporting tape medium 194 in a first direction relative to first tape head 196 and second tape head 198 or in a second direction, opposite the first direction, relative to first tape head 196 and second tape head 198. Such directions are longitudinal to the orientation of the tape medium 194. If the first tape head 196 and the second tape head 198 write or read the tape medium along a direction parallel to the first direction and the second direction, the tape format is referred to as linear. An example of a linear tape format is Linear Tape Open (LTO). If the first tape head 196 and the second tape head 198 write or read the tape medium along a direction which is not parallel to the first direction and second direction, for example, diagonally across the surface of tape medium 194, the tape format is referred to as helical.

Ideally, tape system 195 will write information to tape medium 194 and read information from tape medium 194 without error. The absence of error can be confirmed and the presence of errors detected by configuring the first tape head 196 and the second tape head 198 such that a tape location of the tape medium 194 passes a tape head configured to perform a write operation first and then passes a different tape head configured to perform a read verify operation. The different tape head configured to perform a read operation can read the information that the tape head configured to perform a write operation wrote to the tape medium 194. By comparing the information read from the tape medium 194 to the information that was presumably written to the tape medium 194, the write operation can be verified as successful if the information is the same, or a failure can be detected if the information is different.

Heretofore, if a write or read failure occurred during a backup or restore of data, a tape system could not determine if the tape medium or the tape drive was at fault. If a customer assumes the tape drive to be at fault and returns the tape drive for service, the customer generally doesn't include the tape medium with the returned tape drive. Approximately 50% of field returns of presumably malfunctioning tape drives are due to an error which service personnel could not duplicate (CND). The CND returns are believed to have a root cause related to a faulty tape medium since the tape drive does not fail during failure analysis by service personnel. Instead of dispatching a drive for service, had the tape medium been known to have been faulty, the tape medium could have been dispatched for service, and a costly dispatch and repeat dispatch could have been avoided.

Tape drives include at least two write/read heads. Each write/read head may be configured to perform either a write operation or a read operation. A tape drive can write and read in both a forward direction and a reverse direction. Based on the direction in which the tape medium is being transported during a write operation or a read operation, a leading head is configured to perform a write operation and a trailing head is configured to perform a read operation to allow verification of the write operation during a normal mode.

Tape medium is divided into a plurality of data bands. For example, four data bands may be provided. The data bands are separated by servo bands which the head uses for location information. Within each data band, the tape medium contains several tracks to which a tape head writes and from which a tape head reads.

Instructions, such as instructions of firmware 191 of tape drive 192, may be executed by a processor, such as processor 189 of tape drive 192, to determine if a read/write failure was caused by the tape drive head or the tape medium. As an example, a unique error code will be communicated to the customer via the single character display on the tape drive. Both heads are used to determine if the tape medium or a tape drive head is faulty. A method in accordance with at least one embodiment can be run on the fly or can be customer initiated.

If a write error or a read error occurs, a signal controlling an operational mode of the second tape head to is changed to match a signal control an operational mode of the first tape head. Thus, if the first tape head was performing a write operation after which an error was detected, the second head is configured to perform a second write operation. For example, in the case of a write failure, the read head will be changed to a write head and will write to the same location of the tape medium where the error occurred to determine if the tape head that attempted to write the data in which the error was detected or the tape medium on which the tape head attempted to write the data is faulty. If the same error rate is seen on both heads, the drive will post an error code indicating a tape medium failure. If the error rate is different between the heads, the drive will post an error code indicating a tape head fault since it has been determined that one of the heads has a higher error rate and is not functioning properly.

At least one embodiment of the method can be used for a read failure. If a read error occurs, a signal controlling an operational mode of the second tape head to is changed to match a signal control an operational mode of the first tape head. Thus, if the first tape head was performing a read operation after which an error was detected, the second head is configured to perform a second read operation. For example, in the case of a read failure, the write head will be changed to a read head and will read from the same location of the tape medium where the error occurred to determine if the tape head that attempted to read the data in which the error was detected or the tape medium from which the tape head attempted to read the data is faulty. If the same error rate is seen on both heads, the drive will post an error code indicating a tape medium failure. If the error rate is different between the heads, the drive will post an error code indicating a tape head fault since it has been determined that one of the heads has a higher error rate and is not functioning properly.

In accordance with at least one embodiment, using both heads as read heads allows an undamaged head to recover data from the tape medium even if the tape head that would normally be used to read the data has been damaged or has otherwise failed. Thus, the need for a customer to wait for a replacement drive to be delivered and installed before the customer can recover data when the normal read head is damaged can be avoided.

At least one embodiment may be practiced without the use of any pre-recorded tape medium of known validity, such as a test tape. Rather, differential diagnosis of a tape head failure or a tape medium may be accomplished with no tape media other than the tape medium in use when the error was detected. Since no manual intervention, such as changing between different tape media, is required, the differential diagnosis can be performed automatically and the customer can be informed of the precise nature of the fault without manual troubleshooting actions. As the customer will be informed of the particular component (e.g., tape drive or tape medium) at fault, the return of components for service which are not faulty can be avoided. By correctly identifying and servicing the faulty component the first time, the service process can be expedited and customer satisfaction can be improved.

At least one embodiment of the diagnostic method can be performed for a linear tape drive, such as a Linear Tape Open (LTO) tape drive. At least one embodiment of the diagnostic method can be performed for a tape drive having a lateral aspect to its track arrangement, such as a helical head tape drive.

Figure 2:
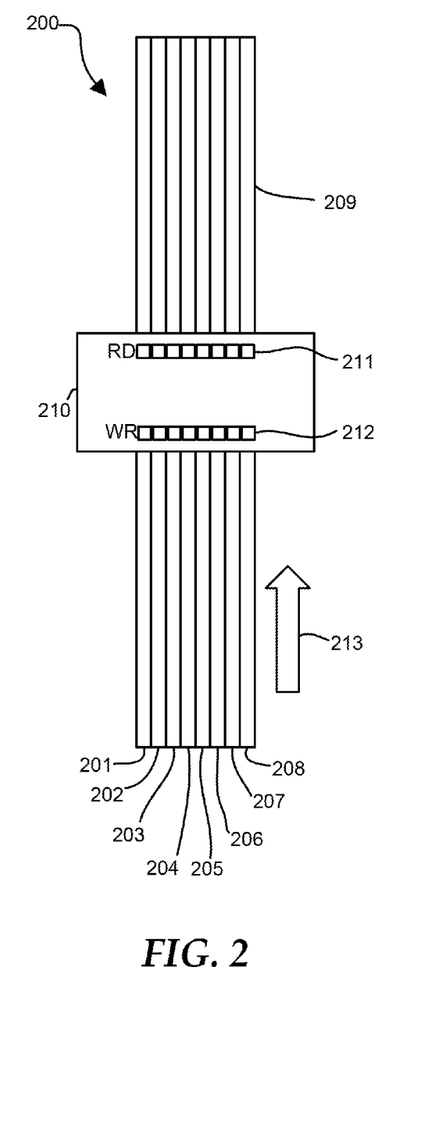
FIG. 2 is a block diagram illustrating a tape drive operating in a normal (non-diagnostic) mode in a first direction according to an embodiment of the present disclosure.

FIG. 2 shows a portion 200 of a tape system operating in a normal (i.e., non-diagnostic) mode in a first direction according to an embodiment of the present disclosure. Portion 200 comprises a tape medium 209 and a tape head assembly 210. Tape medium 209 comprises a plurality of data bands. Each data band comprises a plurality of data sub-bands. Each data sub-band comprises a plurality of tracks 201, 202, 203, 204, 205, 206, 207, and 208. The specific features of tape medium 209, such as the numbers, orientations, and relationships of data bands, data sub-bands, and tracks, illustrated in the drawings and described herein are exemplary, and embodiments may be practiced with other numbers, orientations, and relationships of features. Along the edges of each data band are servo bands to promote tape head alignment with tape medium 209. Tape head assembly 210 comprises a first tape head 211 and a second tape head 212. Each of first tape head 211 and second tape head 212 comprises a plurality of electromagnetic transducers, with at least one electromagnetic transducer for each of tracks 201, 202, 203, 204, 205, 206, 207, and 208. In accordance with at least one embodiment, each of tracks 201, 202, 203, 204, 205, 206, 207, and 208 comprises a plurality of tracks. Tape medium is transported in a direction indicated by arrow 213. In accordance with at least one embodiment, some of the data tracks may be dedicated to be used for write and read operations performed when the tape medium is transported in the direction indicated by arrow 213, and some of the data tracks may be dedicated to be used for write and read operations performed when the tape medium is transported in a reverse direction opposite the direction indicated by arrow 213. To allow write verification, second tape head 212 is configured to perform write operations, as it is the leading tape head with respect to the tape transport direction depicted by arrow 213, and first tape head 211 is configured to perform read operations, as it is the trailing tape head with respect to the tape transport direction depicted by arrow 213.

Figure 3:
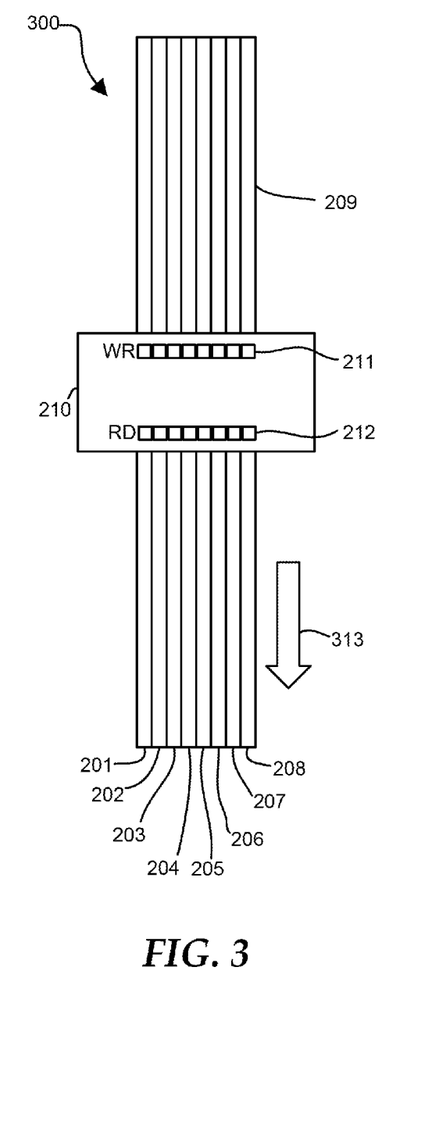
FIG. 3 is a block diagram illustrating a tape drive operating in a normal mode in a second direction according to an embodiment of the present disclosure.

FIG. 3 shows a portion 300 of a tape system operating in a normal (i.e., non-diagnostic) mode in a second direction according to an embodiment of the present disclosure. The second direction, as shown by arrow 313, is opposite the first direction depicted by arrow 213 of FIG. 2. The elements of portion 300 are the same as the elements of portion 200 shown in FIG. 2, but they are configured differently, as described below, to enable operations for tape transport in the second direction. To allow write verification, first tape head 211 is configured to perform write operations, as it is the leading tape head with respect to the tape transport direction depicted by arrow 313, and second tape head 212 is configured to perform read operations, as it is the trailing tape head with respect to the tape transport direction depicted by arrow 313.

Figure 4:
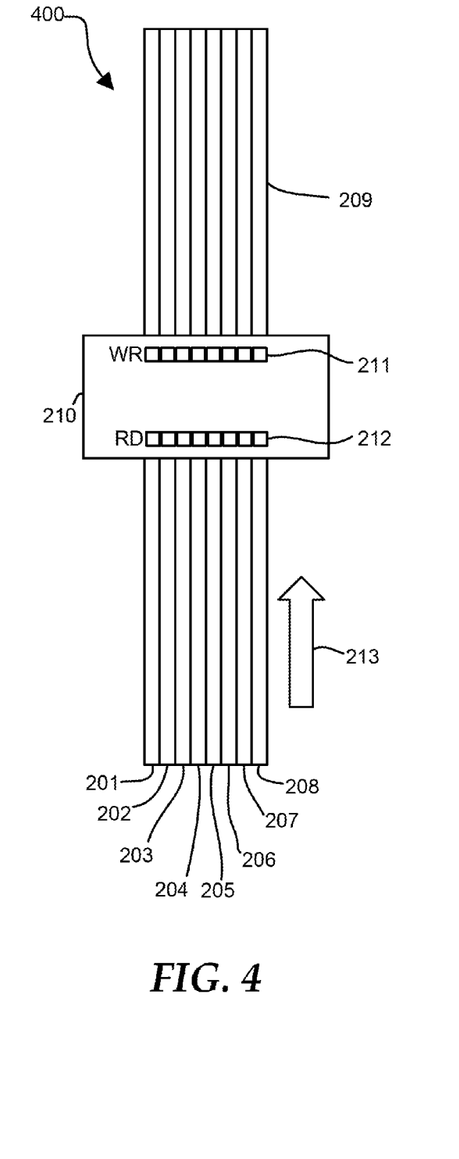
FIG. 4 is a block diagram illustrating a tape drive operating in a first diagnostic mode in a first direction according to an embodiment of the present disclosure.

FIG. 4 shows a portion 400 of a tape system operating in a first diagnostic mode in a first direction according to an embodiment of the present disclosure. The first direction, as shown by arrow 213, is the same as the first direction depicted by arrow 213 of FIG. 2. The elements of portion 400 are the same as the elements of portion 200 shown in FIG. 2 and portion 300 shown in FIG. 3, but they are configured differently, as described below, to enable differential diagnosis of write and read failures that occur while the tape is being transported in the first direction. To allow differential diagnosis, first tape head 211, which is now the trailing tape head, is configured to perform a write operation and second tape head 212, which is now the leading tape head, is configured to perform a read operation. Thus, as shown in FIG. 4, both first tape head 211 and second tape head 212 are configured to perform an opposite operation from how they were configured when the error occurred, as was shown in FIG. 2.

Figure 5:
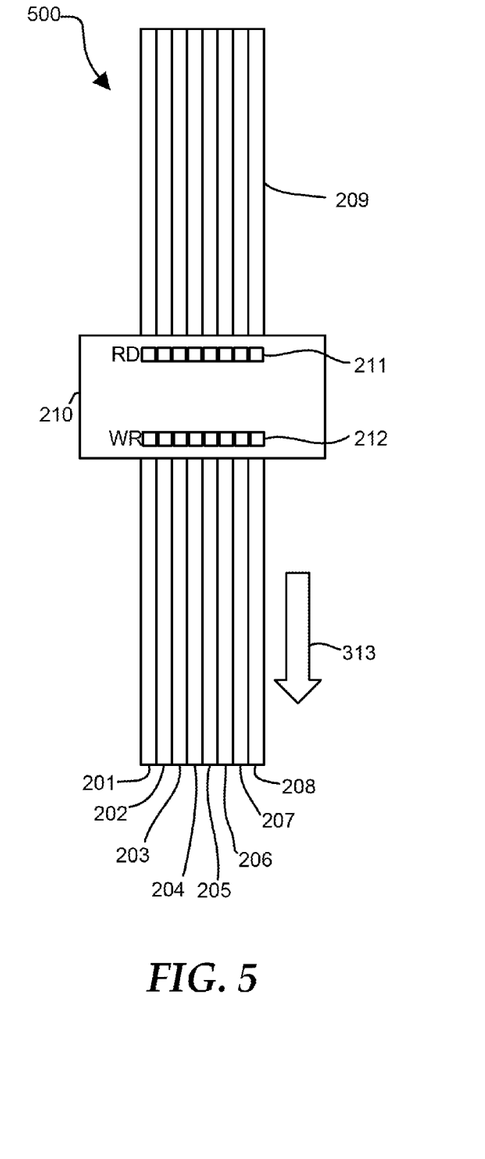
FIG. 5 is a block diagram illustrating a tape drive operating in a first diagnostic mode in a second direction according to an embodiment of the present disclosure.

FIG. 5 shows a portion 500 of a tape system operating in a first diagnostic mode in a second direction according to an embodiment of the present disclosure. The second direction, as shown by arrow 313, is the same as the second direction depicted by arrow 313 of FIG. 3. The elements of portion 500 are the same as the elements of portion 200 shown in FIG. 2 and portion 300 shown in FIG. 3, but they are configured differently, as described below, to enable differential diagnosis of write and read failures that occur while the tape is being transported in the second direction. To allow differential diagnosis, first tape head 211, which is now the leading tape head, is configured to perform a read operation and second tape head 212, which is now the trailing tape head, is configured to perform a write operation. Thus, as shown in FIG. 5, both first tape head 211 and second tape head 212 are configured to perform an opposite operation from how they were configured when the error occurred, as was shown in FIG. 3.

Figures 6, 7:
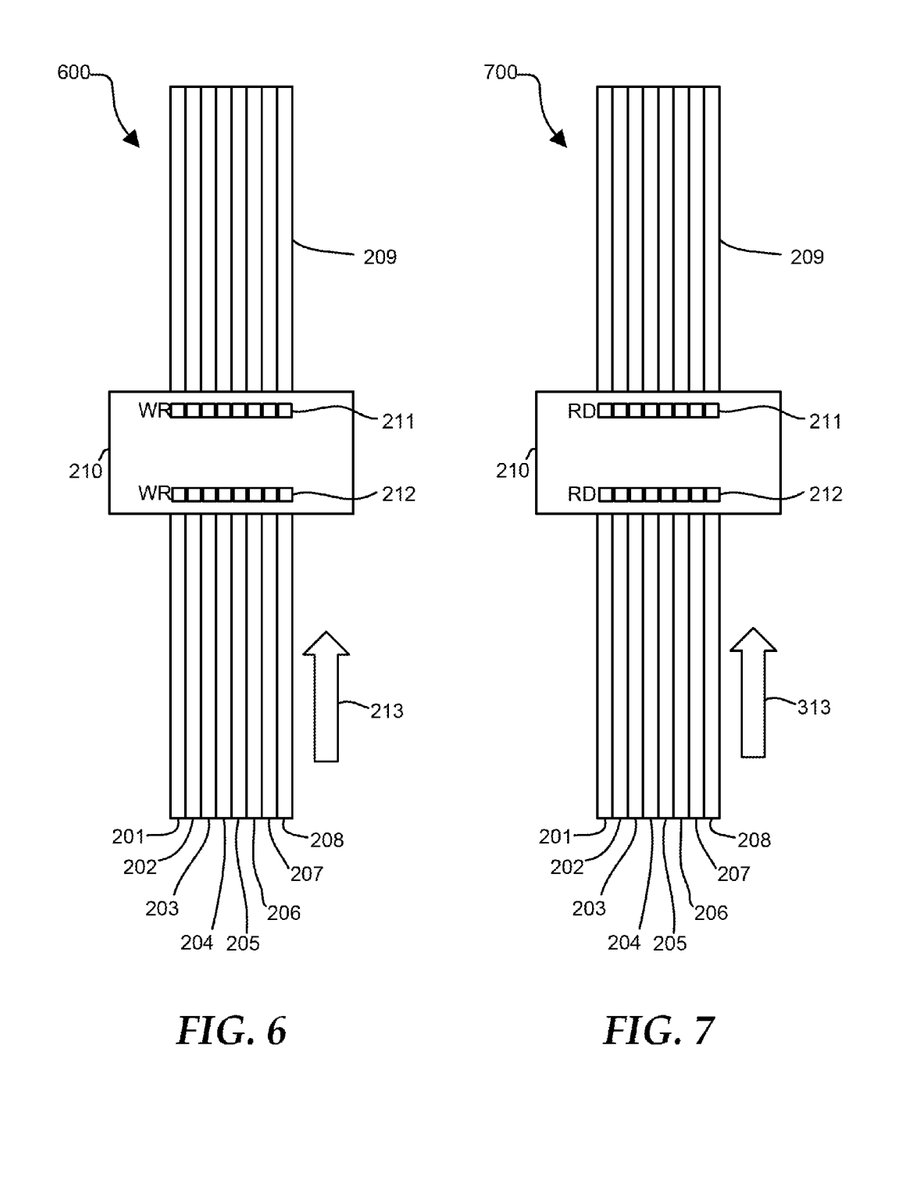
FIG. 6 is a block diagram illustrating a tape drive operating in a second diagnostic mode in a first direction according to an embodiment of the present disclosure.
FIG. 7 is a block diagram illustrating a tape drive operating in a second diagnostic mode in a second direction according to an embodiment of the present disclosure.

FIG. 6 shows a portion 600 of a tape system operating in a second diagnostic mode in a first direction according to an embodiment of the present disclosure. The first direction, as shown by arrow 213, is the same as the first direction depicted by arrow 213 of FIG. 2. The elements of portion 600 are the same as the elements of portion 200 shown in FIG. 2 and portion 300 shown in FIG. 3, but they are configured differently, as described below, to enable differential diagnosis of write and read failures that occur while the tape is being transported in the first direction. To allow differential diagnosis, first tape head 211, which is now the trailing tape head, is configured to perform a write operation and second tape head 212, which is now the leading tape head, is configured to perform a write operation. Thus, as shown in FIG. 4, both first tape head 211 and second tape head 212 are configured to perform a write operation, as opposed to how they were configured when the error occurred, as was shown in FIG. 2. If the first tape head 211 is operating properly to perform the write operation, whether the data will be properly written to the tape medium 209 will depend on whether or not the tape medium 209 is faulty. Even if first tape head 211 is no longer able to perform a write operation, if second tape head 212 is operating properly to perform the write operation and tape medium 209 is not faulty, the data will be properly written to the tape medium 209. Thus, subsequent read operations, such as read operations performed according to the configuration illustrated in FIG. 7, should be able, for at least one of the tape heads, to properly read the data back from the tape medium 209. Based on the instances of the data read back by the first tape head 211 and the second tape head 212, the particular tape head that is faulty can be determined. If neither tape head can read back the data successfully, a tape medium failure can be determined. In accordance with at least one embodiment, the portion 600 of the tape system can be operated in the second direction, as shown by arrow 313 of FIG. 3, in a manner similar to that described above.

FIG. 7 shows a portion 700 of a tape system operating in a second diagnostic mode in a second direction according to an embodiment of the present disclosure. The first direction, as shown by arrow 213, is the same as the first direction depicted by arrow 213 of FIG. 2. The elements of portion 700 are the same as the elements of portion 200 shown in FIG. 2 and portion 300 shown in FIG. 3, but they are configured differently, as described below, to enable differential diagnosis of write and read failures that occur while the tape is being transported in the first direction. To allow differential diagnosis, first tape head 211, which is now the trailing tape head, is configured to perform a read operation and second tape head 212, which is now the leading tape head, is configured to perform a read operation. Thus, as shown in FIG. 4, both first tape head 211 and second tape head 212 are configured to perform a read operation, as opposed to how they were configured when the error occurred, as was shown in FIG. 2. If either the first tape head 211 or the second tape head 212 is operating properly to perform the read operation, whether the data will be properly read to the tape medium 209 will depend on whether or not the tape medium 209 is faulty and whether or not the tape head previously used to write or attempt to write the data to the tape medium 209 is faulty. If a configuration such as that shown in FIG. 6 was used to write the data to the tape medium 209, even if one tape head was unable to perform the write operation, the other tape head should have been able to perform the write operation as long as the tape medium 209 was not faulty. Using the configuration illustrated in FIG. 7, with both tape heads configured to perform the read operation, at least one of the tape heads should be able to properly read the data back from the tape medium 209 if the data was properly written to the tape medium 209 and the tape medium 209 is not faulty. Based on the instances of the data read back by the first tape head 211 and the second tape head 212, the particular tape head that is faulty can be determined. If the first tape head 211 reads back the data correctly, but the second tape head 212 does not, the second tape head 212 can be determined to be faulty. If the second tape head 212 reads back the data correctly, but the first tape head 211 does not, the first tape head 211 can be determined to be faulty. If neither tape head can read back the data successfully, a tape medium failure can be determined. In accordance with at least one embodiment, the portion 700 of the tape system can be operated in the second direction, as shown by arrow 313 of FIG. 3, in a manner similar to that described above.

Figure 8:
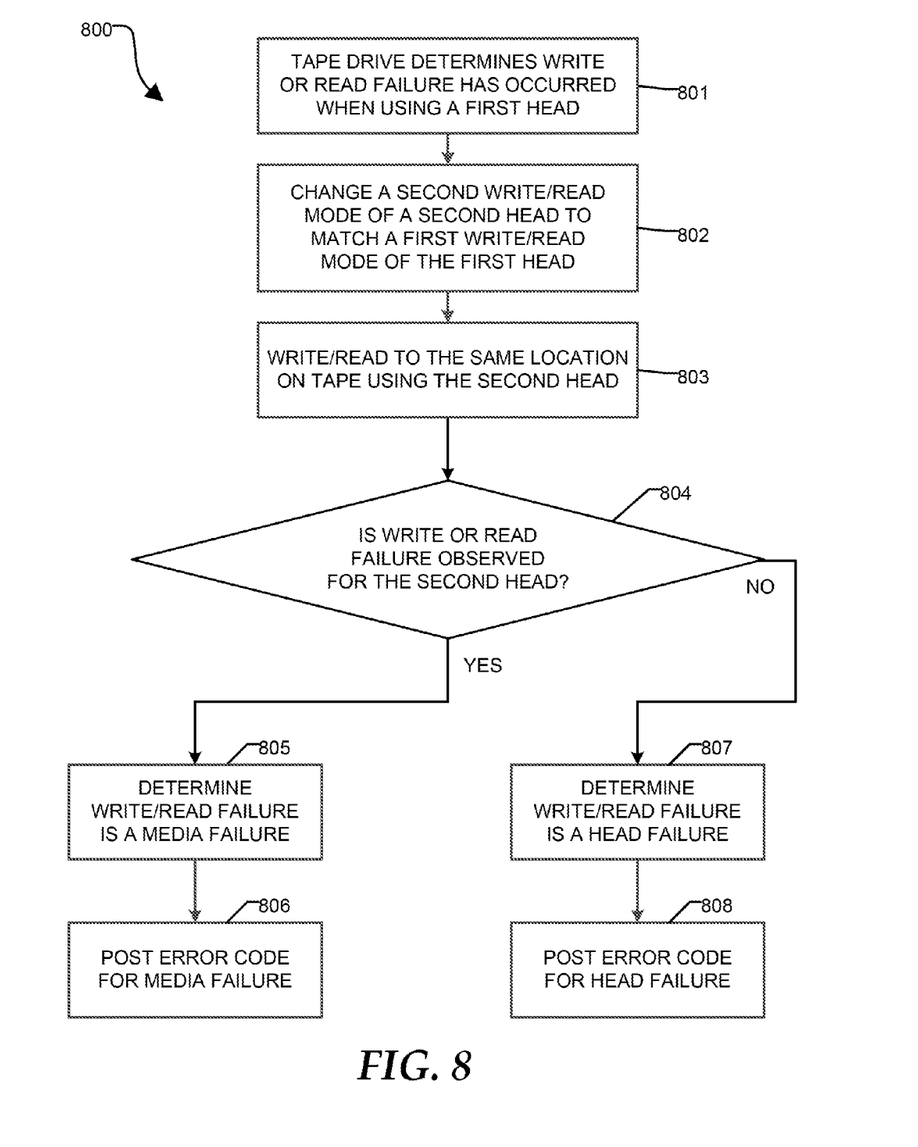
FIG. 8 is a flow diagram illustrating a diagnostic method for a tape storage system according to an embodiment of the present disclosure.

FIG. 8 shows a diagnostic method 800 for a tape storage system according to an embodiment of the present disclosure. Method 800 begins in block 801. In block 801, a tape drive determines write failure or a read failure has occurred. From block 801, the method continues to block 802. In block 802, a signal controlling whether a second head is configured for a write operation or for a read operation is changed to match a signal that controlled whether a first head was configured for a write operation or for a read operation when the error occurred. From block 802, the method continues to block 803. In block 803, the second head is used to perform a similar operation at the same location on the tape medium. For example, in the case of a write failure, what was the read head will be changed to be a write head and will write over the same location of the tape medium to determine if the tape head or medium is at fault. From block 803, the method continues to decision block 804. In decision block 804, a decision is made as to whether or not the write or read failure is observed for the second tape head. The write or read failure may be detected directly, for example, by observing the same particular error at the same location, or indirectly, for example, by observing the same error rate on the first and second heads. If the write or read failure is observed for the second tape head, the method continues to block 805. In block 805, a determination is made that the write or read failure is a tape medium failure. From block 805, the method continues to block 806. In block 806, an error code for a tape medium failure is posted. If, in decision block 804, the write or read failure is not observed for the second tape head, the method continues to block 807. The absence of the write or read failure may be detected directly, for example, by observing the absence of the same particular error at the same location, or indirectly, for example, by observing a different error rate on the first and second heads. In block 807, a determination is made that the write or read failure is a tape head failure. From block 807, the method continues to block 808. In block 808, an error code for a tape head failure is posted.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    performing a tape read operation at a tape location using a first tape head of a tape drive;
    detecting an occurrence of a tape read operation failure;
    in response to detecting the occurrence of the tape read operation failure, performing a second tape read operation at the tape location using a second tape head of the tape drive;
    determining if the tape read operation failure is observed in response to performing the second tape read operation;
    when the tape operation failure is observed in response to performing the second tape operation, determining that the tape operation failure is due to a faulty tape medium and posting a media failure error code representative of a media failure; and
    when the tape operation failure is not observed in response to performing the second tape operation, determining that the tape operation failure is due to a faulty tape head and posting a media failure error code representative of a head failure.

2. The method of claim 1 wherein observation of the tape read operation failure in response to performing the second tape operation is determined based on a first error rate of the tape read operation and a second error rate of the second tape read operation.

3. The method of claim 1 wherein, during the performing the second tape read operation at the tape location using the second tape head, the first tape head is configured as a read head.

4. The method of claim 1 wherein, during the performing the second tape read operation at the tape location using the second tape head, the first tape head is configured as a write head.

5. The method of claim 1 wherein detecting an occurrence of a tape read operation failure comprises:
    determining an error rate based on data read by the tape read operation.

6. The method of claim 1 wherein the tape drive is a linear tape open (LTO) tape drive.

7. A method comprising:
    performing a tape write operation at a tape location using a first tape head of a tape drive;
    performing a tape read operation at the tape location using a second tape head of the tape drive;
    detecting an occurrence of a tape operation failure;
    in response to detecting the occurrence of the tape operation failure, performing a diagnostic tape operation at the tape location selected from a group consisting of a second tape read operation at the tape location using the first tape head and a second tape write operation at the tape location using the second tape head;
    determining if a second tape read operation failure is observed in response to performing the diagnostic tape operation;
    when the second tape operation failure is observed in response to performing the diagnostic tape operation, determining that the second tape operation failure is due to a faulty tape medium and posting a media failure error code representative of a media failure; and
    when the second tape operation failure is not observed in response to performing the diagnostic tape operation, determining that the second tape operation failure is due to a faulty tape head and posting a media failure error code representative of a head failure.

8. The method of claim 7 wherein the determining if the second tape operation failure is observed in response to performing the diagnostic tape operation comprises:
    comparing read data of the tape read operation for the tape location to diagnostic read data of a diagnostic tape read operation for the tape location, the diagnostic tape read operation selected from a group consisting of the second tape read operation and a subsequent tape read operation subsequent to the second tape write operation.

9. The method of claim 7 wherein determining if the second tape operation failure is observed in response to performing the diagnostic tape operation comprises:
    comparing error rates obtained from the tape read operation and the diagnostic tape operation a diagnostic tape read operation for the tape location, the diagnostic tape read operation selected from a group consisting of the second tape read operation and a subsequent tape read operation subsequent to the second tape write operation.

10. The method of claim 8 wherein, when the diagnostic tape operation is the second tape read operation at the tape location using the first tape head, the second tape head is configured as a write head and, when the diagnostic tape operation is the second tape write operation at the tape location using the second tape head, the first tape head is configured as a read head.

11. The method of claim 8 wherein, when the diagnostic tape operation is the second tape read operation at the tape location using the first tape head, the second tape head is configured as a read head and, when the diagnostic tape operation is the second tape write operation at the tape location using the second tape head, the first tape head is configured as a write head.

12. The method of claim 8 wherein the detecting an occurrence of a tape operation failure comprises:
    determining an error rate based on data read by the tape read operation.

13. The method of claim 8 wherein the tape drive is a linear tape open (LTO) tape drive.

14. An information handling system comprising:
    a tape drive including a first tape head and a second tape head, the first tape head and the second tape head configured to perform tape operations with respect to a tape medium; and
    a tape controller including a memory configured to store firmware, the firmware configured, when executed by the tape controller, to cause the tape drive to perform a tape write operation at a tape location using a first tape head of a tape drive, to perform a tape read operation at the tape location using a second tape head of the tape drive, to detect an occurrence of a tape operation failure, to perform, in response to detecting the occurrence of the tape operation failure, a diagnostic tape operation at the tape location selected from a group consisting of a second tape read operation at the tape location using the first tape head and a second tape write operation at the tape location using the second tape head, to determine if a second tape read operation failure is observed in response to performing the diagnostic tape operation, to determine, when the second tape operation failure is observed in response to performing the diagnostic tape operation, that the second tape operation failure is due to a faulty tape medium and posting a media failure error code representative of a media failure, and to determine, when the second tape operation failure is not observed in response to performing the diagnostic tape operation, that the second tape operation failure is due to a faulty tape head and posting a media failure error code representative of a head failure.

15. The information handling system of claim 14 wherein the firmware is further configured, when executed by the tape controller, to cause the tape drive, in determining if a second tape read operation failure is observed in response to performing the diagnostic tape operation, to compare read data of the tape read operation for the tape location to diagnostic read data of a diagnostic tape read operation for the tape location, the diagnostic tape read operation selected from a group consisting of the second tape read operation and a subsequent tape read operation subsequent to the second tape write operation.

16. The information handling system of claim 15 wherein the firmware is further configured, when executed by the tape controller, to cause the tape drive, in determining if a second tape read operation failure is observed in response to performing the diagnostic tape operation, to compare error rates obtained from the tape read operation and the diagnostic tape operation a diagnostic tape read operation for the tape location, the diagnostic tape read operation selected from a group consisting of the second tape read operation and a subsequent tape read operation subsequent to the second tape write operation.

17. The information handling system of claim 15 wherein, when the diagnostic tape operation is the second tape read operation at the tape location using the first tape head, the second tape head is configured as a write head and, when the diagnostic tape operation is the second tape write operation at the tape location using the second tape head, the first tape head is configured as a read head.

18. The information handling system of claim 15 wherein, when the diagnostic tape operation is the second tape read operation at the tape location using the first tape head, the second tape head is configured as a read head and, when the diagnostic tape operation is the second tape write operation at the tape location using the second tape head, the first tape head is configured as a write head.

19. The information handling system of claim 15 wherein the firmware configured, when executed by the tape controller, to cause the tape drive to detect an occurrence of a tape operation failure causes the tape drive to determine an error rate based on data read by the tape read operation.

20. The information handling system of claim 15 wherein the tape drive is a linear tape open (LTO) tape drive.

* * * * *